US012183068B2

(12) United States Patent
Sada et al.

(10) Patent No.: US 12,183,068 B2
(45) Date of Patent: Dec. 31, 2024

(54) SYSTEM AND METHOD FOR RANDOMIZED VERIFICATION OF SERVICES PERFORMED

(71) Applicant: Modern Cleaning Concept L.P., Montreal (CA)

(72) Inventors: Alejandro Bremer Sada, San Pedro Garza García (MX); Daniel Eric Wolfe, Cote St. Luc (CA); Jason Arthur Prizant, Cote St. Luc (CA); Bram Mitchell Lesser, Montreal (CA); Rajiv Uttamchandani, Cote St Luc (CA); Christopher Manitt, Cote-St-Luc (CA); Claire Robbins, Roxboro (CA); Avi Steinberg, Montreal-West (CA)

(73) Assignee: Modern Cleaning Concept L.P., Montreal (CA)

( * ) Notice: Subject to any disclaimer, the term of this patent is extended or adjusted under 35 U.S.C. 154(b) by 399 days.

(21) Appl. No.: 17/519,098

(22) Filed: Nov. 4, 2021

(65) Prior Publication Data
US 2023/0133515 A1    May 4, 2023

(51) Int. Cl.
*G06V 20/10*      (2022.01)
*G06F 3/04842*   (2022.01)
(Continued)

(52) U.S. Cl.
CPC .......... *G06V 20/10* (2022.01); *G06F 3/04842* (2013.01); *G06V 10/235* (2022.01); *G06V 10/751* (2022.01); *G06F 2203/04803* (2013.01)

(58) Field of Classification Search
CPC .... G06V 20/10; G06V 10/235; G06V 10/751; G06V 20/52; G06F 3/04842;
(Continued)

(56) References Cited

U.S. PATENT DOCUMENTS 6,920,241 B1 * 7/2005 Dutta-Choudhury ....................... G06T 7/001
382/160
2004/0220822 A1   11/2004 Talarico
(Continued)

FOREIGN PATENT DOCUMENTS

CN      105411491 A      3/2016
CN      108846551 A     11/2018

*Primary Examiner* — Wesley J Tucker
*Assistant Examiner* — Han Hoang
(74) *Attorney, Agent, or Firm* — Occhiuti & Rohlicek LLP

(57) ABSTRACT

Computing platforms and methods are disclosed for verification of cleaning services to be performed in an area to be cleaned. Exemplary implementations may: identify, from among a plurality of cleaning regions relating to the area to be cleaned, a group of designated cleaning regions; randomly generate, with respect to the plurality of cleaning regions, a set of inspection regions; provide a user interface to prompt a user to capture an image of each inspection region; directly capture the images of each inspection region via the user interface; compare the captured images of each inspection region with corresponding reference images to determine whether each of the inspection regions has been properly cleaned; and output an inspection result based on the comparison of the captured images with the corresponding reference images. Implementations provide a method for virtually supervising otherwise unsupervised workers, which increases accountability and generates unprecedented visibility.

20 Claims, 4 Drawing Sheets

(51) Int. Cl.
*G06V 10/22* (2022.01)
*G06V 10/75* (2022.01)

(58) Field of Classification Search
CPC ...... G06F 2203/04803; G06Q 10/0639; G06Q 50/10; G06Q 10/06395
See application file for complete search history.

(56) References Cited

U.S. PATENT DOCUMENTS

| | | |
|---|---|---|
| 2005/0027589 A1 | 2/2005 | Jenkins et al. |
| 2005/0222889 A1 | 10/2005 | Lai et al. |
| 2006/0259309 A1 | 11/2006 | Pigott |
| 2007/0243919 A1* | 10/2007 | Thelen .................. A63F 13/10 463/9 |
| 2009/0276239 A1 | 11/2009 | Swart et al. |
| 2010/0127922 A1 | 5/2010 | Sooy |
| 2010/0171826 A1 | 7/2010 | Hamilton et al. |
| 2011/0050881 A1 | 3/2011 | Terayoko |
| 2013/0229516 A1 | 9/2013 | Jones |
| 2015/0039402 A1 | 2/2015 | Madison et al. |
| 2016/0298970 A1 | 10/2016 | Lindhe et al. |
| 2020/0005070 A1* | 1/2020 | Ambikapathi ...... G06F 18/2413 |
| 2020/0050995 A1* | 2/2020 | Ramanand ........... H04W 4/029 |
| 2021/0067693 A1* | 3/2021 | Matsuoka ............ H04N 23/611 |
| 2022/0319390 A1* | 10/2022 | Zhang .................... G09G 5/14 |
| 2023/0000302 A1* | 1/2023 | Oyaizu ................ G06T 7/0008 |

* cited by examiner

SYSTEM AND METHOD FOR RANDOMIZED VERIFICATION OF SERVICES PERFORMED

FIELD

The present disclosure relates to verification of services to be performed, including but not limited to computing platforms, methods, and storage media for verification of cleaning services to be performed in an area to be cleaned.

BACKGROUND

When a commercial cleaning company is hired to provide cleaning services, it can be difficult for both the client and the cleaning company to evaluate whether the job has been done properly in accordance with the terms and conditions of the services agreement.

There are inherent difficulties in overseeing or managing a workforce spread out over geographical areas. In addition, even upon inspection it can be difficult to assess whether an area that appears unclean was not cleaned properly, or was properly cleaned but then dirtied by a customer or occupant after the proper cleaning.

According to some existing approaches, photos may be taken of areas after cleaning, and provided to a supervisor and/or client as proof of a job having been properly done. However, such approaches are open to misrepresentation, for example if a member of the cleaning staff saves older photos of cleaned areas.

Improvements in approaches for verification of cleaning services to be performed in an area to be cleaned are desirable.

SUMMARY

One aspect of the present disclosure relates to a computing platform configured for verification of cleaning services to be performed in an area to be cleaned. The computing platform may include a non-transient computer-readable storage medium having executable instructions embodied thereon. The computing platform may include one or more hardware processors configured to execute the instructions. The processor(s) may execute the instructions to identify, from among a plurality of cleaning regions relating to the area to be cleaned, a group of designated cleaning regions. The processor(s) may execute the instructions to randomly generate, with respect to the plurality of cleaning regions, a set of inspection regions. The set of inspection regions may be a subset of the plurality of cleaning regions and includes at least one of the designated cleaning regions. The processor(s) may execute the instructions to provide a user interface to prompt a user to capture an image of each inspection region in the set of inspection regions. The processor(s) may execute the instructions to directly capture the images of each inspection region via the user interface. The processor(s) may execute the instructions to compare the captured images of each inspection region with corresponding reference images to determine whether each of the inspection regions has been properly cleaned. The processor(s) may execute the instructions to output an inspection result based on the comparison of the captured images with the corresponding reference images.

Another aspect of the present disclosure relates to a method for verification of cleaning services to be performed in an area to be cleaned. The method may include identifying, from among a plurality of cleaning regions relating to the area to be cleaned, a group of designated cleaning regions. The method may include randomly generating, with respect to the plurality of cleaning regions, a set of inspection regions. The set of inspection regions may be a subset of the plurality of cleaning regions and including at least one of the designated cleaning regions. The method may include providing a user interface to prompt a user to capture an image of each inspection region in the set of inspection regions. The method may include directly capturing the images of each inspection region via the user interface. The method may include comparing the captured images of each inspection region with corresponding reference images to determine whether each of the inspection regions has been properly cleaned. The method may include outputting an inspection result based on the comparison of the captured images with the corresponding reference images.

Yet another aspect of the present disclosure relates to a non-transient computer-readable storage medium having instructions embodied thereon, the instructions being executable by one or more processors to perform a method for verification of cleaning services to be performed in an area to be cleaned. The method may include identifying, from among a plurality of cleaning regions relating to the area to be cleaned, a group of designated cleaning regions. The method may include randomly generating, with respect to the plurality of cleaning regions, a set of inspection regions. The set of inspection regions may be a subset of the plurality of cleaning regions and including at least one of the designated cleaning regions. The method may include providing a user interface to prompt a user to capture an image of each inspection region in the set of inspection regions. The method may include directly capturing the images of each inspection region via the user interface. The method may include comparing the captured images of each inspection region with corresponding reference images to determine whether each of the inspection regions has been properly cleaned. The method may include outputting an inspection result based on the comparison of the captured images with the corresponding reference images.

BRIEF DESCRIPTION OF THE DRAWINGS

Embodiments of the present disclosure will now be described, by way of example only, with reference to the attached Figures.

DETAILED DESCRIPTION

Figure 1:
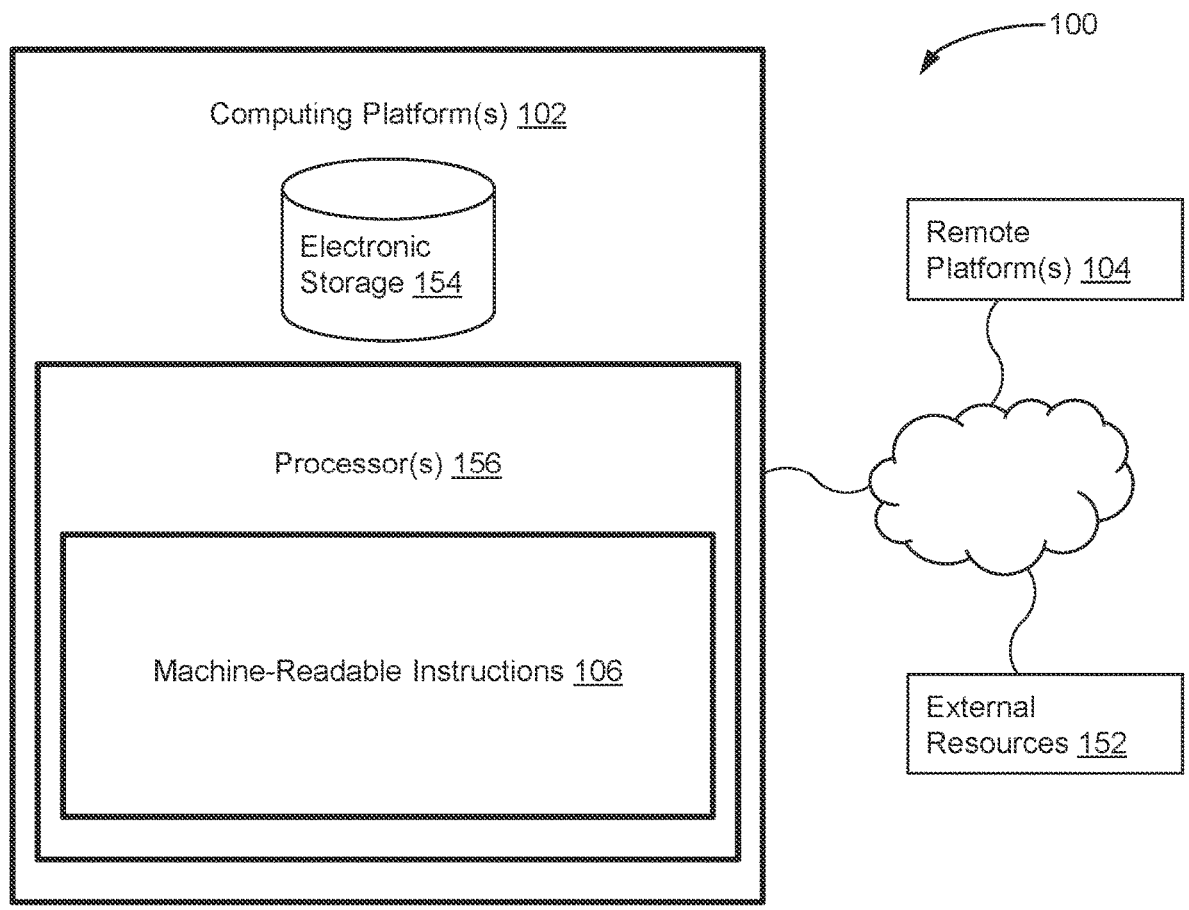
FIG. 1 illustrates a system configured for verification of cleaning services to be performed in an area to be cleaned, in accordance with one or more embodiments.

Computing platforms, methods, and storage media for verification of cleaning services to be performed in an area to be cleaned are disclosed. Exemplary implementations may: identify, from among a plurality of cleaning regions relating to the area to be cleaned, a group of designated cleaning regions; randomly generate, with respect to the plurality of cleaning regions, a set of inspection regions; provide a user interface to prompt a user to capture an image of each inspection region in the set of inspection regions; directly capture the images of each inspection region via the user interface; compare the captured images of each inspection region with corresponding reference images to determine whether each of the inspection regions has been properly cleaned; and output an inspection result based on the comparison of the captured images with the corresponding reference images.

In an embodiment, the present disclosure provides a software solution that provides a method for virtually supervising otherwise unsupervised workers, which increases accountability and generates unprecedented visibility. In an example embodiment, a method is provided to automate and randomize verification of areas to be cleaned, while ensuring that designated, or important, areas are included.

While example embodiments will be described herein with respect to verification of cleaning services, and cleaning regions, in other embodiments the systems and methods described herein relate more generally to verification of services to be performed in an area to be serviced, including a group of designated service regions, and a set of inspection regions.

For the purpose of promoting an understanding of the principles of the disclosure, reference will now be made to the features illustrated in the drawings and specific language will be used to describe the same. It will nevertheless be understood that no limitation of the scope of the disclosure is thereby intended. Any alterations and further modifications, and any further applications of the principles of the disclosure as described herein are contemplated as would normally occur to one skilled in the art to which the disclosure relates. It will be apparent to those skilled in the relevant art that some features that are not relevant to the present disclosure may not be shown in the drawings for the sake of clarity.

Certain terms used in this application and their meaning as used in this context are set forth in the description below. To the extent a term used herein is not defined, it should be given the broadest definition persons in the pertinent art have given that term as reflected in at least one printed publication or issued patent. Further, the present processes are not limited by the usage of the terms shown below, as all equivalents, synonyms, new developments and terms or processes that serve the same or a similar purpose are considered to be within the scope of the present disclosure.

FIG. 1 illustrates a system 100 configured for verification of cleaning services to be performed in an area to be cleaned, in accordance with one or more embodiments. In some embodiments, system 100 may include one or more computing platforms 102. Computing platform(s) 102 may be configured to communicate with one or more remote platforms 104 according to a client/server architecture, a peer-to-peer architecture, and/or other architectures. Remote platform(s) 104 may be configured to communicate with other remote platforms via computing platform(s) 102 and/or according to a client/server architecture, a peer-to-peer architecture, and/or other architectures. Users may access system 100 via remote platform(s) 104. Computing platform(s) 102 may be configured by machine-readable instructions 106. Machine-readable instructions 106 may include one or more instruction modules. The instruction modules may include computer program modules.

In an embodiment, the machine-readable instructions 106 are configured to cause the processor(s) 156 to perform a method of verification of cleaning services to be performed in an area to be cleaned. Such an embodiment, which will be described later in further detail in relation to FIG. 4, includes identifying, from among a plurality of cleaning regions relating to the area to be cleaned, a group of designated cleaning regions. In an example embodiment, the group of designated cleaning regions comprises a group of cleaning regions that have been designated to be included among the regions to be cleaned, based on having been designated as important or high priority. The designation may be performed before-hand, for example by a manager, owner, or agent of the owner of the premises to be cleaned, or by a representative from a services company tasked with performing the cleaning services, or collaboratively.

In an embodiment, the method includes randomly generating, with respect to the plurality of cleaning regions, a set of inspection regions. The set of inspection regions are a subset of the plurality of cleaning regions and include at least one of the designated cleaning regions. In this way, the set of inspection regions is quasi-randomly generated, in that the set of inspection regions includes at least one of the designated cleaning regions, and then the remaining inspection regions are generated randomly from among the plurality of cleaning regions. For example, in an embodiment the method includes: randomly generating at least one designated cleaning region from among the identified group of designated cleaning regions; and randomly generating remaining regions in the set of inspection regions from among the plurality of cleaning regions that are absent from the group of designated cleaning regions.

In an embodiment, the method further includes providing a user interface to prompt a user to capture an image of each inspection region in the set of inspection regions. In an example embodiment, the method includes, for a selected inspection region from among the set of inspection regions, providing a selected inspection region reference image in a first portion of a split-screen user interface. In such an example embodiment, the method also includes, for a selected inspection region from among the set of inspection regions, providing an image capture preview in a second portion of the split-screen user interface to prompt the user to capture an image of the selected inspection region.

In an embodiment, the method further includes directly capturing the images of each inspection region via the user interface, for example obtaining a live camera capture from a user device, optionally while preventing any other means of image capture. The directly captured images of each inspection region may be stored in an image capture memory that is inaccessible to the user and independent of a user device, for example at a cloud server such that the captured images are accessible using a uniform resource locator.

In an embodiment, the method further includes comparing the captured images of each inspection region with corresponding reference images to determine whether each of the inspection regions has been properly cleaned. This aspect enables the method to ensure that the captured image relates to the proper inspection region, and optionally to ensure that the captured image reflects a state of cleanliness that is substantially similar or sufficiently similar to the state of cleanliness captured in the corresponding reference image. In an embodiment, the method further includes outputting an inspection result based on the comparison of the captured images with the corresponding reference images.

In an implementation, an area to be cleaned is divided into a number of different cleaning regions. The cleaning regions may be classified with respect to location, e.g. first floor, second floor. The cleaning regions may also be classified or tagged with respect to a type of region, e.g. entrance, bathroom. Reference photos may be obtained with respect to the defined cleaning regions.

In an embodiment of the present disclosure, a quasi-randomly generated set of inspection regions is provided to the cleaning staff, for example at the end of a cleaning job. The set of inspection regions is a subset of the plurality of cleaning regions into which the area to be cleaned is divided. Because the cleaning staff does not know which inspection regions will be randomly selected for that particular day or job, the cleaning staff need to ensure that all cleaning regions are properly cleaned in accordance with the established contractual terms and conditions between the client and service provider. This is particularly evident in example implementations in which the set of inspection regions is specified at the end of the cleaning job, or when the cleaning job is indicated as being completed, or at a time at which the cleaning job is supposed to have been completed.

In an example embodiment, a software solution is provided as an "app" used by the cleaning staff to capture photos of the inspection regions. In an example embodiment, the software provides an inspection region reference photo, to help the cleaning staff ensure that they are providing a photo of the proper inspection region. Having the app directly capture the photo avoids potential misrepresentations by cleaning staff who may have otherwise tried to upload previously taken photos. Date stamping and/or geo-tagging may additionally be used to authenticate that the photos are legitimately being taken at the time of completion of the job for which the inspection is being performed.

Embodiments of the present disclosure may be configured to generate the set of inspection regions with some randomization and some intention. For example, the software may be configured to ensure that the set of inspection regions always includes certain designated areas, for example, that the inspection regions always include the front entrance and at least two bathroom areas. The designated areas may vary based on the area and the type of area to be cleaned, for example a bank, retail, fast food, etc.

Embodiments of the present disclosure are configured to randomize the selection of inspection regions, for example providing different inspection regions each day, or each time a particular cleaning job is performed. This approach encourages or ensures increased vigilance on the part of cleaning staff, partly by removing means to circumvent the inspection, by randomizing the areas to be inspected while ensuring that designated areas of importance are included.

Figure 2A:
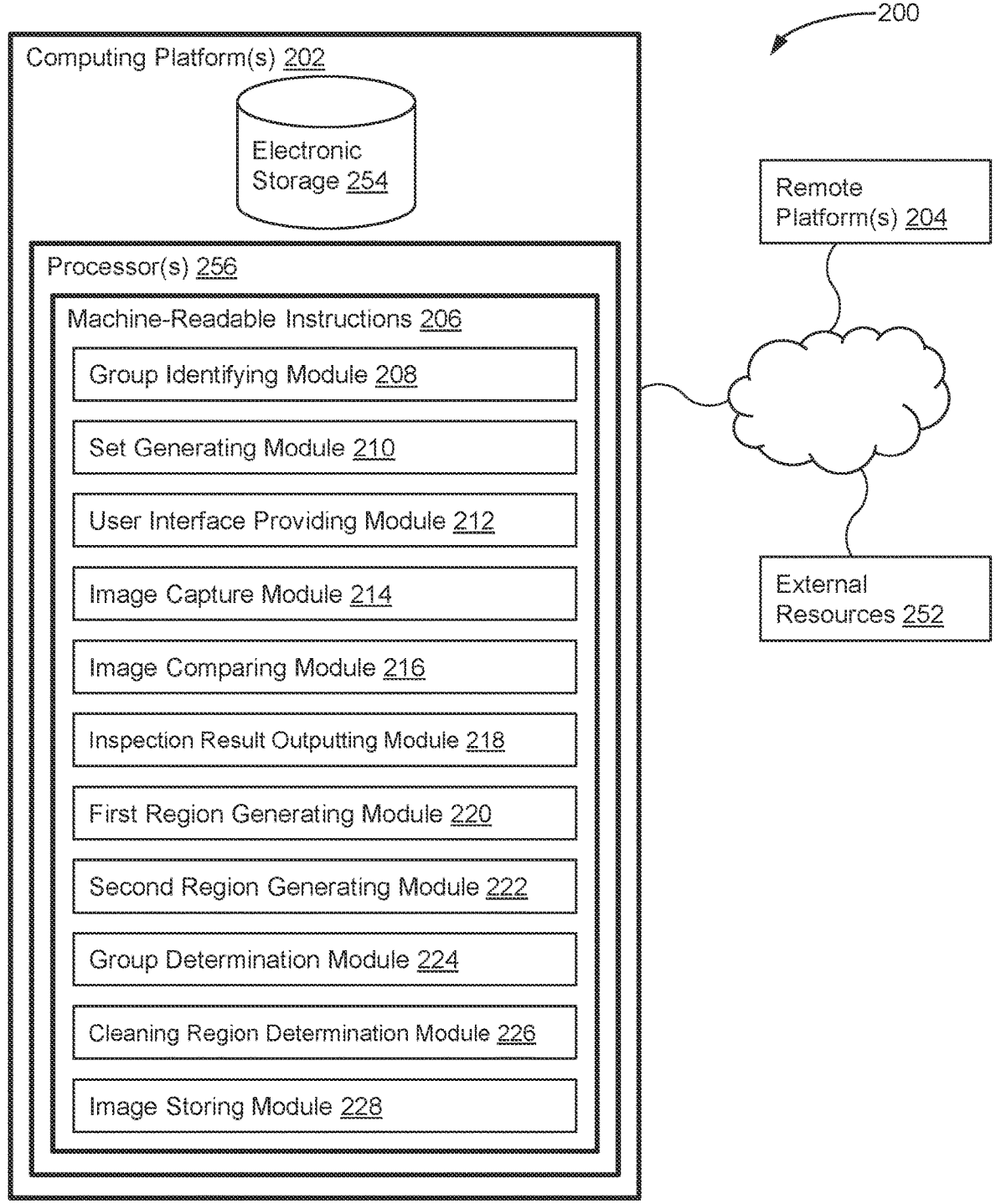
FIG. 2A and FIG. 2B illustrate a system configured for verification of cleaning services to be performed in an area to be cleaned, in accordance with one or more embodiments.
Figure 2B:
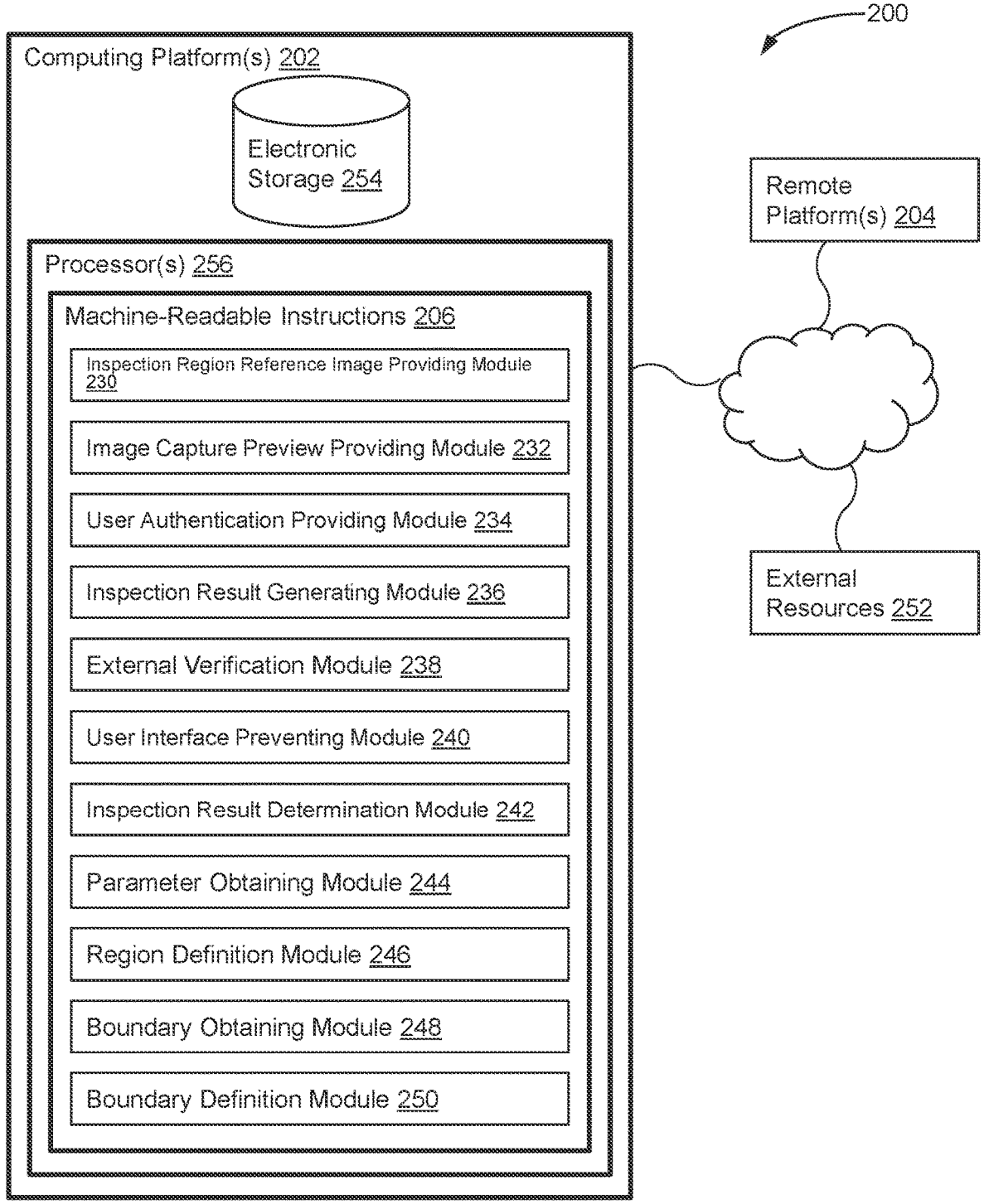

FIG. 2A and FIG. 2B illustrate a system 200 configured for verification of cleaning services to be performed in an area to be cleaned, in accordance with one or more embodiments. While FIG. 2A and FIG. 2B are presented as separate figures, it is to be understood that in some embodiments, the system 200 may include the elements of both FIG. 2A and FIG. 2B. In some embodiments, system 200 may include one or more computing platforms 202. Computing platform(s) 202 may be configured to communicate with one or more remote platforms 204 according to a client/server architecture, a peer-to-peer architecture, and/or other architectures. Remote platform(s) 204 may be configured to communicate with other remote platforms via computing platform(s) 202 and/or according to a client/server architecture, a peer-to-peer architecture, and/or other architectures. Users may access system 200 via remote platform(s) 204.

Computing platform(s) 202 may be configured by machine-readable instructions 206. Machine-readable instructions 206 may include one or more instruction modules. The instruction modules may include computer program modules.

Referring to FIG. 2A, the instruction modules may include one or more of group identifying module 208, set generating module 210, user interface providing module 212, image capture module 214, image comparing module 216, inspection result outputting module 218, first region generating module 220, second region generating module 222, group determination module 224, cleaning region determination module 226, and image storing module 228.

Group identifying module 208 may be configured to identify, from among a plurality of cleaning regions relating to the area to be cleaned, a group of designated cleaning regions.

Set generating module 210 may be configured to randomly generate, with respect to the plurality of cleaning regions, a set of inspection regions. Randomly generating the set of inspection regions may be performed based on a random number generator. In an example implementation, the generated random number may be used to select one or more of the plurality of cleaning regions based on a number or other reference or designator assigned to, or associated with, each of the plurality of cleaning regions. For example, if the plurality of cleaning regions are numbered 00 through 29, the generated random number may be used to select one or more numbers associated with one or more of the plurality of cleaning regions. Randomly generating the set of inspection regions may be performed based on a quasi-random number generator. The set of inspection regions may be a subset of the plurality of cleaning regions and include at least one of the designated cleaning regions.

Set generating module 210 may be configured to, for a new cleaning period, randomly generate an updated set of inspection regions, the updated set of inspection regions being different from the originally generated set of inspection regions. The new cleaning period may include a new cleaning shift. The new cleaning period may include a new calendar date.

User interface providing module 212 may be configured to provide a user interface to prompt a user to capture an image of each inspection region in the set of inspection regions. In an example embodiment, the user interface is provided to, at, or on, a mobile device or computing device operated by a member of the cleaning staff. In such an implementation, the method enables self-verification of the cleaning services to be performed.

User interface providing module 212 may be configured to provide the user interface to prompt the user to capture a second image of the second inspection region only in response to a satisfactory first inspection result based on the comparison of a first captured image of the first inspection region with the corresponding reference image. In an example implementation, the user interface will not prompt the user for an image of a current region until after an image of a previous region has been successfully provided, and optionally has resulted in a satisfactory outcome or determination based on the comparison to the reference image.

Image capture module 214 may be configured to directly capture the images of each inspection region via the user interface.

Image comparing module 216 may be configured to compare the captured images of each inspection region with corresponding reference images to determine whether each of the inspection regions has been properly cleaned. Image comparing module 216 may be configured to compare, using a machine learning-based comparator, the captured images of each inspection region with the corresponding reference images.

Inspection result outputting module 218 may be configured to output an inspection result based on the comparison of the captured images with the corresponding reference images. Inspection result outputting module 218 may be configured to output the inspection result based at least in part on a received external verification result, for example if the inspection result is based on an image comparison performed by, or using, an external verification system or device.

First region generating module 220 may be configured to randomly generate at least one designated cleaning region from among the identified group of designated cleaning regions, for inclusion in the set of inspection regions. Second region generating module 222 may be configured to randomly generate remaining regions in the set of inspection regions from among the plurality of cleaning regions that are absent from the group of designated cleaning regions, for inclusion in the set of inspection regions.

Group determination module 224 may be configured to determine the group of designated cleaning regions based on a stored cleaning profile, and optionally in conjunction with the first and/or second region generating modules 220 and 222. The stored cleaning profile may include a property type-specific cleaning profile. The stored cleaning profile may include an industry-specific cleaning profile. The stored cleaning profile may include a franchisor-specific cleaning profile, an owner-specific cleaning profile, a contract-specific cleaning profile, or a site-specific cleaning profile.

Cleaning region determination module 226 may be configured to determine whether each of the plurality of cleaning regions belongs in the group of designated cleaning regions based on the stored cleaning profile. In an example embodiment, the determination may be additionally based on additional stored data or data obtained at the time of identifying or obtaining a list or group of designated cleaning regions.

Image storing module 228 may be configured to store the directly captured images of each inspection region in an image capture memory that is inaccessible to the user and independent of a user device. Image storing module 228 may be configured to store the captured images at a cloud server such that the captured images are accessible using a uniform resource locator.

Referring to FIG. 2B, the instruction modules may include one or more of inspection region reference image providing module 230, image capture preview providing module 232, user authentication providing module 234, inspection result generating module 236, external verification module 238, user interface preventing module 240, inspection result determination module 242, parameter obtaining module 244, region definition module 246, boundary obtaining module 248, boundary definition module 250, and/or other instruction modules.

Inspection region reference image providing module 230 may be configured to, for a selected inspection region from among the set of inspection regions, provide a selected inspection region reference image in a first portion of a split-screen user interface. For example, the first portion of the split-screen user interface may be a top portion, a bottom portion, and left side portion or a right side portion.

Image capture preview providing module 232 may be configured to, for a selected inspection region from among the set of inspection regions, provide an image capture preview in a second portion of the split-screen user interface to prompt the user to capture an image of the selected inspection region. In an embodiment, the second portion is complementary to the first portion, for example when the first portion is a top portion, the second portion is a bottom portion. Providing the image capture preview in the second portion of the split-screen user interface may include obtaining a live camera capture from a user device.

User authentication providing module 234 may be configured to provide, via the user interface, a user authentication to determine that the user being prompted to capture the image corresponds to a person assigned to perform the cleaning services being verified. The method may be a part of a self-verification process such that the user prompted to capture the images is also the person assigned to perform the cleaning services being verified.

Inspection result generating module 236 may be configured to compare, using a machine learning-based comparator, the captured images of each inspection region with the corresponding reference images, and to generate the inspection result based at least in part on a result of the comparison using the machine learning-based comparator.

External verification module 238 may be configured to send, for external verification, at least one of the captured images and the corresponding reference images, and to output the inspection result based at least in part on a received external verification result.

User interface preventing module 240 may be configured to prevent the user interface from capturing a subsequent image in response to an unsatisfactory inspection result based on the comparison of a previous captured image with the corresponding reference image. Consider an example embodiment including a first inspection region and a subsequent second inspection region in the set of inspection regions. User interface preventing module 240, or another module, may be configured to provide the user interface to prompt the user to capture a second image of the second inspection region only in response to a satisfactory first inspection result based on the comparison of a first captured image of the first inspection region with the corresponding reference image.

Inspection result determination module 242 may be configured to determine a region-specific inspection result based on determining within a degree of certainty that the captured image for a specific region matches the corresponding reference image for the specific region and represents a properly cleaned area.

Parameter obtaining module 244 may be configured to obtain parameters characterizing the plurality of cleaning regions. Region definition module 246 may be configured to define the plurality of cleaning regions based on the obtained characterizing parameters. Region definition module 246 may be configured to define the plurality of cleaning regions based on the obtained boundaries.

Boundary obtaining module 248 may be configured to obtain boundaries characterizing the plurality of cleaning regions. Boundary definition module 250 may be configured to define the boundaries characterizing the plurality of cleaning regions.

In some implementations, directly capturing the images may include obtaining a live camera capture from a user device. In some implementations, directly capturing the images may include obtaining a live camera capture from a user device while preventing any other means of image capture.

In some embodiments, computing platform(s) 202, remote platform(s) 204, and/or external resources 252 may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which computing platform(s) 202, remote platform(s) 204, and/or external resources 252 may be operatively linked via some other communication media.

A given remote platform 204 may include one or more processors configured to execute computer program modules. The computer program modules may be configured to enable an expert or user associated with the given remote platform 204 to interface with system 200 and/or external resources 252, and/or provide other functionality attributed herein to remote platform(s) 204. By way of non-limiting example, a given remote platform 204 and/or a given computing platform 202 may include one or more of a server, a desktop computer, a laptop computer, a handheld computer, a tablet computing platform, a NetBook, a Smartphone, a gaming console, and/or other computing platforms.

External resources 252 may include sources of information outside of system 200, external entities participating with system 200, and/or other resources. In some embodiments, some or all of the functionality attributed herein to external resources 252 may be provided by resources included in system 200.

Computing platform(s) 202 may include electronic storage 254, one or more processors 256, and/or other components. Computing platform(s) 202 may include communication lines, or ports to enable the exchange of information with a network and/or other computing platforms.

Illustration of computing platform(s) 202 in FIG. 2A and FIG. 2B is not intended to be limiting. Computing platform(s) 202 may include a plurality of hardware, software, and/or firmware components operating together to provide the functionality attributed herein to computing platform(s) 202. For example, computing platform(s) 202 may be implemented by a cloud of computing platforms operating together as computing platform(s) 202.

Electronic storage 254 may comprise non-transitory storage media that electronically stores information. The electronic storage media of electronic storage 254 may include one or both of system storage that is provided integrally (i.e., substantially non-removable) with computing platform(s) 202 and/or removable storage that is removably connectable to computing platform(s) 202 via, for example, a port (e.g., a USB port, a firewire port, etc.) or a drive (e.g., a disk drive, etc.). Electronic storage 254 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 254 may include one or more virtual storage resources (e.g., cloud storage, a virtual private network, and/or other virtual storage resources). Electronic storage 254 may store software algorithms, information determined by processor(s) 256, information received from computing platform(s) 202, information received from remote platform(s) 204, and/or other information that enables computing platform(s) 202 to function as described herein.

Processor(s) 256 may be configured to provide information processing capabilities in computing platform(s) 202. As such, processor(s) 256 may include one or more of a digital processor, an analog processor, a digital circuit designed to process information, an analog circuit designed to process information, a state machine, and/or other mechanisms for electronically processing information. Although processor(s) 256 is shown in FIG. 2A and FIG. 2B as a single entity, this is for illustrative purposes only. In some embodiments, processor(s) 256 may include a plurality of processing units. These processing units may be physically located within the same device, or processor(s) 256 may represent processing functionality of a plurality of devices operating in coordination. Processor(s) 256 may be configured to execute modules 208, 210, 212, 214, 216, 218, 220, 222, 224, 226, 228, 230, 232, 234, 236, 238, 240, 242, 244, 246, 248, and/or 250, and/or other modules. Processor(s) 256 may be configured to execute modules 208, 210, 212, 214, 216, 218, 220, 222, 224, 226, 228, 230, 232, 234, 236, 238, 240, 242, 244, 246, 248, and/or 250, and/or other modules by software; hardware; firmware; some combination of software, hardware, and/or firmware; and/or other mechanisms for configuring processing capabilities on processor(s) 256. As used herein, the term "module" may refer to any component or set of components that perform the functionality attributed to the module. This may include one or more physical processors during execution of processor readable instructions, the processor readable instructions, circuitry, hardware, storage media, or any other components.

It should be appreciated that although modules 208, 210, 212, 214, 216, 218, 220, 222, 224, 226, 228, 230, 232, 234, 236, 238, 240, 242, 244, 246, 248, and/or 250 are illustrated in FIG. 2A and FIG. 2B as being implemented within a single processing unit, in embodiments in which processor(s) 256 includes multiple processing units, one or more of modules 208, 210, 212, 214, 216, 218, 220, 222, 224, 226, 228, 230, 232, 234, 236, 238, 240, 242, 244, 246, 248, and/or 250 may be implemented remotely from the other modules. The description of the functionality provided by the different modules 208, 210, 212, 214, 216, 218, 220, 222, 224, 226, 228, 230, 232, 234, 236, 238, 240, 242, 244, 246, 248, and/or 250 described below is for illustrative purposes, and is not intended to be limiting, as any of modules 208, 210, 212, 214, 216, 218, 220, 222, 224, 226, 228, 230, 232, 234, 236, 238, 240, 242, 244, 246, 248, and/or 250 may provide more or less functionality than is described. For example, one or more of modules 208, 210, 212, 214, 216, 218, 220, 222, 224, 226, 228, 230, 232, 234, 236, 238, 240, 242, 244, 246, 248, and/or 250 may be eliminated, and some or all of its functionality may be provided by other ones of modules 208, 210, 212, 214, 216, 218, 220, 222, 224, 226, 228, 230, 232, 234, 236, 238, 240, 242, 244, 246, 248, and/or 250. As another example, processor(s) 256 may be configured to execute one or more additional modules that may perform some or all of the functionality attributed below to one of modules 208, 210, 212, 214, 216, 218, 220, 222, 224, 226, 228, 230, 232, 234, 236, 238, 240, 242, 244, 246, 248, and/or 250.

Figure 3:
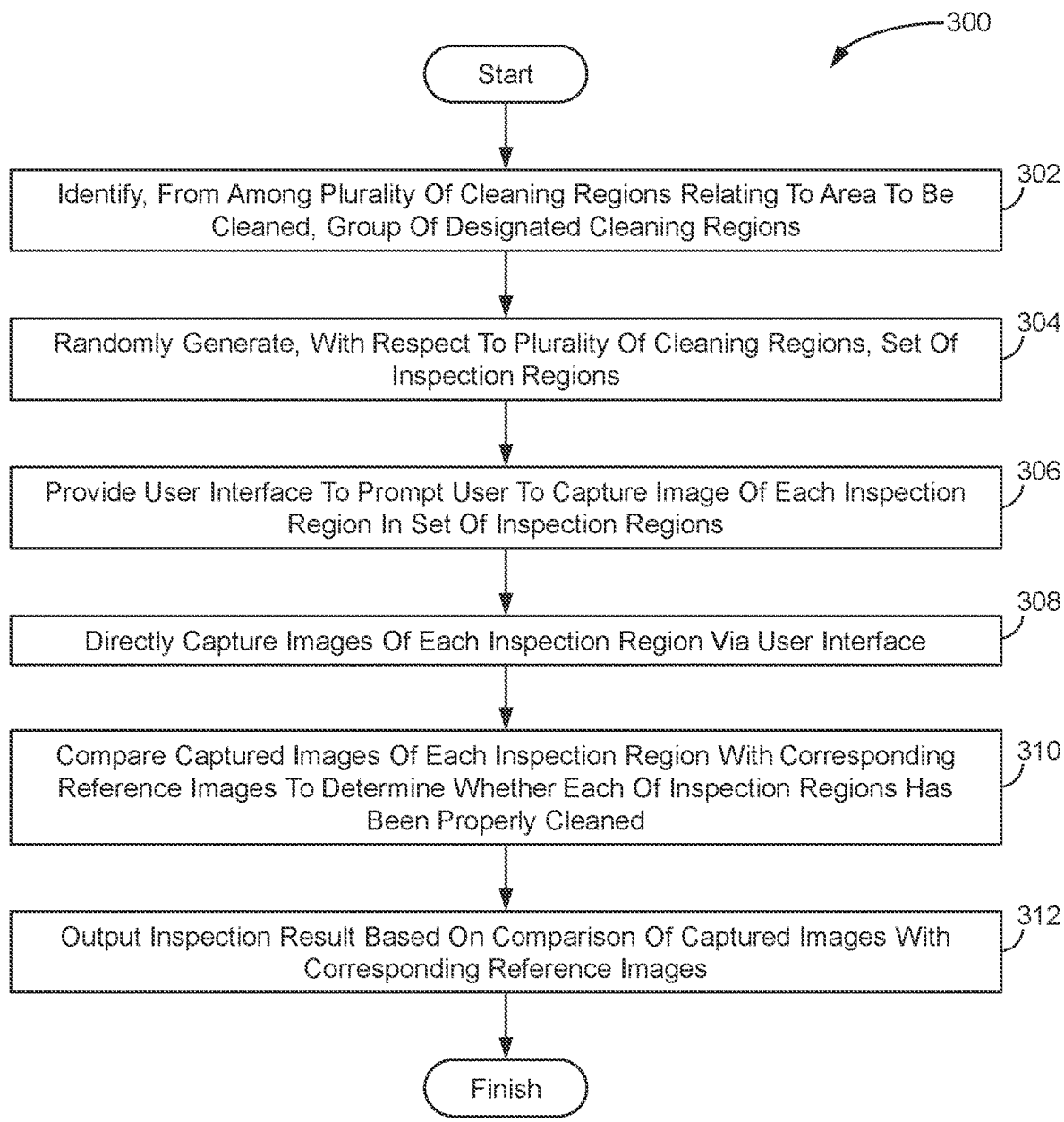
FIG. 3 illustrates a method for verification of cleaning services to be performed in an area to be cleaned, in accordance with one or more embodiments.

FIG. 3 illustrates a method 300 for verification of cleaning services to be performed in an area to be cleaned, in accordance with one or more embodiments. The operations of method 300 presented below are intended to be illustrative. In some embodiments, method 300 may be accomplished with one or more additional operations not described, and/or without one or more of the operations discussed. Additionally, the order in which the operations of method 300 are illustrated in FIG. 3 and described below is not intended to be limiting.

In some embodiments, method 300 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 300 in response to instructions stored electronically on an electronic storage medium.

The one or more processing devices may include one or more devices configured through hardware, firmware, and/or software to be specifically designed for execution of one or more of the operations of method 300.

An operation 302 may include identifying, from among a plurality of cleaning regions relating to the area to be cleaned, a group of designated cleaning regions. Operation 302 may be performed by one or more hardware processors configured by machine-readable instructions including a module that is the same as or similar to group identifying module 208, in accordance with one or more embodiments.

An operation 304 may include randomly generating, with respect to the plurality of cleaning regions, a set of inspection regions. The set of inspection regions may be a subset of the plurality of cleaning regions and including at least one of the designated cleaning regions. Operation 304 may be performed by one or more hardware processors configured by machine-readable instructions including a module that is the same as or similar to set generating module 210, in accordance with one or more embodiments.

An operation 306 may include providing a user interface to prompt a user to capture an image of each inspection region in the set of inspection regions. Operation 306 may be performed by one or more hardware processors configured by machine-readable instructions including a module that is the same as or similar to user interface providing module 212, in accordance with one or more embodiments.

An operation 308 may include directly capturing the images of each inspection region via the user interface. Operation 308 may be performed by one or more hardware processors configured by machine-readable instructions including a module that is the same as or similar to image capture module 214, in accordance with one or more embodiments.

An operation 310 may include comparing the captured images of each inspection region with corresponding reference images to determine whether each of the inspection regions has been properly cleaned. Operation 310 may be performed by one or more hardware processors configured by machine-readable instructions including a module that is the same as or similar to image comparing module 216, in accordance with one or more embodiments.

An operation 312 may include outputting an inspection result based on the comparison of the captured images with the corresponding reference images. Operation 312 may be performed by one or more hardware processors configured by machine-readable instructions including a module that is the same as or similar to inspection result outputting module 218, in accordance with one or more embodiments.

While specific example embodiments have been described in detail above and in relation to the drawings, the present disclosure includes further embodiments. In another aspect, the present disclosure provides a computer-implemented method for verification of services to be performed in an area. For example, the method relates broadly to services performed with respect to service regions, and are not restricted to cleaning services. In an embodiment, the method comprises: identifying, from among a plurality of regions relating to the area to be serviced, a group of designated service regions; randomly generating, with respect to the plurality of service regions, a set of inspection regions, the set of inspection regions being a subset of the plurality of service regions and including at least one of the designated service regions; providing a user interface to prompt a user to capture an image of each inspection region in the set of inspection regions; directly capturing the images of each inspection region via the user interface; comparing the captured images of each inspection region with corresponding reference images to determine whether each of the inspection regions has been properly serviced; and outputting an inspection result based on the comparison of the captured images with the corresponding reference images.

In another aspect, the present disclosure provides a computer-implemented method for verification of cleaning services to be performed in an area to be cleaned. In this aspect, the method employs designated cleaning regions, without specifying any steps relating to identifying the designated cleaning regions. In an embodiment, the method comprises: randomly generating, with respect to the plurality of cleaning regions, a set of inspection regions, the set of inspection regions being a subset of the plurality of cleaning regions and including at least one of designated cleaning regions; providing a user interface to prompt a user to capture an image of each inspection region in the set of inspection regions; directly capturing the images of each inspection region via the user interface; comparing the captured images of each inspection region with corresponding reference images to determine whether each of the inspection regions has been properly cleaned; and outputting an inspection result based on the comparison of the captured images with the corresponding reference images.

In a further aspect, the present disclosure provides a computer-implemented method for verification of cleaning services to be performed in an area to be cleaned. In this aspect, the method is performed independent of any designated cleaning regions. In an example embodiment, the method comprises: randomly generating, with respect to a plurality of cleaning regions relating to the area to be cleaned, a set of inspection regions, the set of inspection regions being a subset of the plurality of cleaning regions; prompting a user to capture an image of each inspection region in the set of inspection regions; directly capturing the images of each inspection region via the user interface; comparing the captured images of each inspection region with corresponding reference images to determine whether each of the inspection regions has been properly cleaned; and outputting an inspection result based on the comparison of the captured images with the corresponding reference images.

With respect to the additional aspects recited above, related embodiments of the present disclosure provide a system configured for verification of services, such as cleaning services, to be performed. The system may include one or more hardware processors configured by machine-readable instructions. The processor(s) may be configured to perform any one of the methods described and illustrated herein. Similarly, other embodiments provide a non-transient computer-readable storage medium having instructions embodied thereon, the instructions being executable by one or more processors to perform any one of the methods for verification of services, such as cleaning services, as described and illustrated herein. Further, additional embodiments provide computing platform configured for verification of services, such as cleaning services, to be performed. The computing platform may include a non-transient computer-readable storage medium having executable instructions embodied thereon. The computing platform may include one or more hardware processors configured to execute the instructions. The processor(s) may execute the instructions to perform any one of the methods described and illustrated herein.

In the preceding description, for purposes of explanation, numerous details are set forth in order to provide a thorough understanding of the embodiments. However, it will be apparent to one skilled in the art that these specific details are not required. In other instances, well-known electrical structures and circuits are shown in block diagram form in order not to obscure the understanding. For example, specific details are not provided as to whether the embodiments described herein are implemented as a software routine, hardware circuit, firmware, or a combination thereof.

Embodiments of the disclosure can be represented as a computer program product stored in a machine-readable medium (also referred to as a computer-readable medium, a processor-readable medium, or a computer usable medium having a computer-readable program code embodied therein). The machine-readable medium can be any suitable tangible, non-transitory medium, including magnetic, optical, or electrical storage medium including a compact disk read only memory (CD-ROM), digital versatile disk (DVD), Blu-ray Disc Read Only Memory (BD-ROM), memory device (volatile or non-volatile), or similar storage mechanism. The machine-readable medium can contain various sets of instructions, code sequences, configuration information, or other data, which, when executed, cause a processor to perform steps in a method according to an embodiment of the disclosure. Those of ordinary skill in the art will appreciate that other instructions and operations necessary to implement the described implementations can also be stored on the machine-readable medium. The instructions stored on the machine-readable medium can be executed by a processor or other suitable processing device, and can interface with circuitry to perform the described tasks.

The above-described embodiments are intended to be examples only. Alterations, modifications and variations can be effected to the particular embodiments by those of skill in the art without departing from the scope, which is defined solely by the claims appended hereto.

Embodiments of the disclosure can be described with reference to the following clauses, with specific features laid out in the clauses describing some implementations. According to embodiments of the present disclosure, the features described in relation to some implementations may be provided in combination with one or more of the other features described in relation to some embodiments.

One aspect of the present disclosure relates to a system configured for verification of cleaning services to be performed in an area to be cleaned. The system may include one or more hardware processors configured by machine-readable instructions. The processor(s) may be configured to identify, from among a plurality of cleaning regions relating to the area to be cleaned, a group of designated cleaning regions. The processor(s) may be configured to randomly generate, with respect to the plurality of cleaning regions, a set of inspection regions. The set of inspection regions may be a subset of the plurality of cleaning regions and including at least one of the designated cleaning regions. The processor(s) may be configured to provide a user interface to prompt a user to capture an image of each inspection region in the set of inspection regions. The processor(s) may be configured to directly capture the images of each inspection region via the user interface. The processor(s) may be configured to compare the captured images of each inspection region with corresponding reference images to determine whether each of the inspection regions has been properly cleaned. The processor(s) may be configured to output an inspection result based on the comparison of the captured images with the corresponding reference images.

In some implementations of the system, the processor(s) may be configured to randomly generate at least one designated cleaning region from among the identified group of designated cleaning regions. In some implementations of the system, the processor(s) may be configured to randomly generate remaining regions in the set of inspection regions from among the plurality of cleaning regions that are absent from the group of designated cleaning regions.

In some implementations of the system, the processor(s) may be configured to determine the group of designated cleaning regions based on a stored cleaning profile.

In some implementations of the system, the processor(s) may be configured to determine whether each of the plurality of cleaning regions belongs in the group of designated cleaning regions based on the stored cleaning profile.

In some implementations of the system, the stored cleaning profile may include a property type-specific cleaning profile.

In some implementations of the system, the stored cleaning profile may include an industry-specific cleaning profile.

In some implementations of the system, the stored cleaning profile may include a franchisor-specific cleaning profile.

In some implementations of the system, the stored cleaning profile may include an owner-specific cleaning profile.

In some implementations of the system, the stored cleaning profile may include a contract-specific cleaning profile.

In some implementations of the system, the stored cleaning profile may include a site-specific cleaning profile.

In some implementations of the system, randomly generating the set of inspection regions may be performed based on a random number generator.

In some implementations of the system, randomly generating the set of inspection regions may be performed based on a quasi-random number generator.

In some implementations of the system, directly capturing the images may include obtaining a live camera capture from a user device.

In some implementations of the system, directly capturing the images may include obtaining a live camera capture from a user device while preventing any other means of image capture.

In some implementations of the system, the processor(s) may be configured to store the directly captured images of each inspection region in an image capture memory that is inaccessible to the user and independent of a user device.

In some implementations of the system, the processor(s) may be configured to store the captured images at a cloud server such that the captured images are accessible using a uniform resource locator.

In some implementations of the system, the processor(s) may be configured to, for a selected inspection region from among the set of inspection regions, provide a selected inspection region reference image in a first portion of a split-screen user interface. In some implementations of the system, the processor(s) may be configured to, for a selected inspection region from among the set of inspection regions, provide an image capture preview in a second portion of the split-screen user interface to prompt the user to capture an image of the selected inspection region.

In some implementations of the system, providing the image capture preview in the second portion of the split-screen user interface may include obtaining a live camera capture from a user device.

In some implementations of the system, the processor(s) may be configured to provide, via the user interface, a user authentication to determine that the user being prompted to capture the image corresponds to a person assigned to perform the cleaning services being verified.

In some implementations of the system, the processor(s) may be configured to compare, using a machine learning-based comparator, the captured images of each inspection region with the corresponding reference images. In some implementations of the system, the processor(s) may be configured to generate the inspection result based at least in part on a result of the comparison using the machine learning-based comparator.

In some implementations of the system, the processor(s) may be configured to send, for external verification, at least one of the captured images and the corresponding reference images. In some implementations of the system, the processor(s) may be configured to output the inspection result based at least in part on a received external verification result.

In some implementations of the system, with respect to a first inspection region and a subsequent second inspection region in the set of inspection regions. In some implementations of the system, the processor(s) may be configured to provide the user interface to prompt the user to capture a second image of the second inspection region only in response to a satisfactory first inspection result based on the comparison of a first captured image of the first inspection region with the corresponding reference image.

In some implementations of the system, the processor(s) may be configured to prevent the user interface from capturing a subsequent image in response to an unsatisfactory inspection result based on the comparison of a previous captured image with the corresponding reference image.

In some implementations of the system, the processor(s) may be configured to determine a region-specific inspection result based on determining within a degree of certainty that the captured image for a specific region matches the corresponding reference image for the specific region and represents a properly cleaned area.

In some implementations of the system, the processor(s) may be configured to obtain parameters characterizing the plurality of cleaning regions. In some implementations of the system, the processor(s) may be configured to define the plurality of cleaning regions based on the obtained characterizing parameters.

In some implementations of the system, the processor(s) may be configured to obtain boundaries characterizing the plurality of cleaning regions. In some implementations of the system, the processor(s) may be configured to define the plurality of cleaning regions based on the obtained boundaries.

In some implementations of the system, the processor(s) may be configured to define the boundaries characterizing the plurality of cleaning regions.

In some implementations of the system, the processor(s) may be configured to, for a new cleaning period, randomly generate an updated set of inspection regions, the updated set of inspection regions being different from the originally generated set of inspection regions.

In some implementations of the system, the new cleaning period may include a new cleaning shift.

In some implementations of the system, the new cleaning period may include a new calendar date.

In some implementations of the system, the method may be a part of a self-verification process such that the user prompted to capture the images is also the person assigned to perform the cleaning services being verified.

Another aspect of the present disclosure relates to a method for verification of cleaning services to be performed in an area to be cleaned. The method may include identifying, from among a plurality of cleaning regions relating to the area to be cleaned, a group of designated cleaning regions. The method may include randomly generating, with respect to the plurality of cleaning regions, a set of inspection regions. The set of inspection regions may be a subset of the plurality of cleaning regions and including at least one of the designated cleaning regions. The method may include providing a user interface to prompt a user to capture an image of each inspection region in the set of inspection regions. The method may include directly capturing the images of each inspection region via the user interface. The method may include comparing the captured images of each inspection region with corresponding reference images to determine whether each of the inspection regions has been properly cleaned. The method may include outputting an inspection result based on the comparison of the captured images with the corresponding reference images.

In some implementations of the method, it may include randomly generating at least one designated cleaning region from among the identified group of designated cleaning regions. In some implementations of the method, it may include randomly generating remaining regions in the set of inspection regions from among the plurality of cleaning regions that are absent from the group of designated cleaning regions.

In some implementations of the method, it may include determining the group of designated cleaning regions based on a stored cleaning profile.

In some implementations of the method, it may include determining whether each of the plurality of cleaning regions belongs in the group of designated cleaning regions based on the stored cleaning profile.

In some implementations of the method, the stored cleaning profile may include a property type-specific cleaning profile.

In some implementations of the method, the stored cleaning profile may include an industry-specific cleaning profile.

In some implementations of the method, the stored cleaning profile may include a franchisor-specific cleaning profile.

In some implementations of the method, the stored cleaning profile may include an owner-specific cleaning profile.

In some implementations of the method, the stored cleaning profile may include a contract-specific cleaning profile.

In some implementations of the method, the stored cleaning profile may include a site-specific cleaning profile.

In some implementations of the method, randomly generating the set of inspection regions may be performed based on a random number generator.

In some implementations of the method, randomly generating the set of inspection regions may be performed based on a quasi-random number generator.

In some implementations of the method, directly capturing the images may include obtaining a live camera capture from a user device.

In some implementations of the method, directly capturing the images may include obtaining a live camera capture from a user device while preventing any other means of image capture.

In some implementations of the method, it may include storing the directly captured images of each inspection region in an image capture memory that is inaccessible to the user and independent of a user device.

In some implementations of the method, it may include storing the captured images at a cloud server such that the captured images are accessible using a uniform resource locator.

In some implementations of the method, it may include, for a selected inspection region from among the set of inspection regions, providing a selected inspection region reference image in a first portion of a split-screen user interface. In some implementations of the method, it may include, for a selected inspection region from among the set of inspection regions, providing an image capture preview in a second portion of the split-screen user interface to prompt the user to capture an image of the selected inspection region.

In some implementations of the method, providing the image capture preview in the second portion of the split-screen user interface may include obtaining a live camera capture from a user device.

In some implementations of the method, it may include providing, via the user interface, a user authentication to determine that the user being prompted to capture the image corresponds to a person assigned to perform the cleaning services being verified.

In some implementations of the method, it may include comparing, using a machine learning-based comparator, the captured images of each inspection region with the corresponding reference images. In some implementations of the method, it may include generating the inspection result based at least in part on a result of the comparison using the machine learning-based comparator.

In some implementations of the method, it may include sending, for external verification, at least one of the captured images and the corresponding reference images. In some implementations of the method, it may include outputting the inspection result based at least in part on a received external verification result.

In some implementations of the method, with respect to a first inspection region and a subsequent second inspection region in the set of inspection regions. In some implementations of the method, it may include providing the user interface to prompt the user to capture a second image of the second inspection region only in response to a satisfactory first inspection result based on the comparison of a first captured image of the first inspection region with the corresponding reference image.

In some implementations of the method, it may include preventing the user interface from capturing a subsequent image in response to an unsatisfactory inspection result based on the comparison of a previous captured image with the corresponding reference image.

In some implementations of the method, it may include determining a region-specific inspection result based on determining within a degree of certainty that the captured image for a specific region matches the corresponding reference image for the specific region and represents a properly cleaned area.

In some implementations of the method, it may include obtaining parameters characterizing the plurality of cleaning regions. In some implementations of the method, it may include defining the plurality of cleaning regions based on the obtained characterizing parameters.

In some implementations of the method, it may include obtaining boundaries characterizing the plurality of cleaning regions. In some implementations of the method, it may include defining the plurality of cleaning regions based on the obtained boundaries.

In some implementations of the method, it may include defining the boundaries characterizing the plurality of cleaning regions.

In some implementations of the method, it may include, for a new cleaning period, randomly generating an updated set of inspection regions, the updated set of inspection regions being different from the originally generated set of inspection regions.

In some implementations of the method, the new cleaning period may include a new cleaning shift.

In some implementations of the method, the new cleaning period may include a new calendar date.

In some implementations of the method, the method may be a part of a self-verification process such that the user prompted to capture the images is also the person assigned to perform the cleaning services being verified.

Yet another aspect of the present disclosure relates to a non-transient computer-readable storage medium having instructions embodied thereon, the instructions being executable by one or more processors to perform a method for verification of cleaning services to be performed in an area to be cleaned. The method may include identifying, from among a plurality of cleaning regions relating to the area to be cleaned, a group of designated cleaning regions. The method may include randomly generating, with respect to the plurality of cleaning regions, a set of inspection regions. The set of inspection regions may be a subset of the plurality of cleaning regions and including at least one of the designated cleaning regions. The method may include providing a user interface to prompt a user to capture an image of each inspection region in the set of inspection regions. The method may include directly capturing the images of each inspection region via the user interface. The method may include comparing the captured images of each inspection region with corresponding reference images to determine whether each of the inspection regions has been properly cleaned. The method may include outputting an inspection result based on the comparison of the captured images with the corresponding reference images.

In some implementations of the computer-readable storage medium, the method may include randomly generating at least one designated cleaning region from among the identified group of designated cleaning regions. In some implementations of the computer-readable storage medium, the method may include randomly generating remaining regions in the set of inspection regions from among the plurality of cleaning regions that are absent from the group of designated cleaning regions.

In some implementations of the computer-readable storage medium, the method may include determining the group of designated cleaning regions based on a stored cleaning profile.

In some implementations of the computer-readable storage medium, the method may include determining whether each of the plurality of cleaning regions belongs in the group of designated cleaning regions based on the stored cleaning profile.

In some implementations of the computer-readable storage medium, the stored cleaning profile may include a property type-specific cleaning profile.

In some implementations of the computer-readable storage medium, the stored cleaning profile may include an industry-specific cleaning profile.

In some implementations of the computer-readable storage medium, the stored cleaning profile may include a franchisor-specific cleaning profile.

In some implementations of the computer-readable storage medium, the stored cleaning profile may include an owner-specific cleaning profile.

In some implementations of the computer-readable storage medium, the stored cleaning profile may include a contract-specific cleaning profile.

In some implementations of the computer-readable storage medium, the stored cleaning profile may include a site-specific cleaning profile.

In some implementations of the computer-readable storage medium, randomly generating the set of inspection regions may be performed based on a random number generator.

In some implementations of the computer-readable storage medium, randomly generating the set of inspection regions may be performed based on a quasi-random number generator.

In some implementations of the computer-readable storage medium, directly capturing the images may include obtaining a live camera capture from a user device.

In some implementations of the computer-readable storage medium, directly capturing the images may include obtaining a live camera capture from a user device while preventing any other means of image capture.

In some implementations of the computer-readable storage medium, the method may include storing the directly captured images of each inspection region in an image capture memory that is inaccessible to the user and independent of a user device.

In some implementations of the computer-readable storage medium, the method may include storing the captured images at a cloud server such that the captured images are accessible using a uniform resource locator.

In some implementations of the computer-readable storage medium, the method may include, for a selected inspection region from among the set of inspection regions, providing a selected inspection region reference image in a first portion of a split-screen user interface. In some implementations of the computer-readable storage medium, the method may include, for a selected inspection region from among the set of inspection regions, providing an image capture preview in a second portion of the split-screen user interface to prompt the user to capture an image of the selected inspection region.

In some implementations of the computer-readable storage medium, providing the image capture preview in the second portion of the split-screen user interface may include obtaining a live camera capture from a user device.

In some implementations of the computer-readable storage medium, the method may include providing, via the user interface, a user authentication to determine that the user being prompted to capture the image corresponds to a person assigned to perform the cleaning services being verified.

In some implementations of the computer-readable storage medium, the method may include comparing, using a machine learning-based comparator, the captured images of each inspection region with the corresponding reference images. In some implementations of the computer-readable storage medium, the method may include generating the inspection result based at least in part on a result of the comparison using the machine learning-based comparator.

In some implementations of the computer-readable storage medium, the method may include sending, for external verification, at least one of the captured images and the corresponding reference images. In some implementations of the computer-readable storage medium, the method may include outputting the inspection result based at least in part on a received external verification result.

In some implementations of the computer-readable storage medium, with respect to a first inspection region and a subsequent second inspection region in the set of inspection regions. In some implementations of the computer-readable storage medium, the method may include providing the user interface to prompt the user to capture a second image of the second inspection region only in response to a satisfactory first inspection result based on the comparison of a first captured image of the first inspection region with the corresponding reference image.

In some implementations of the computer-readable storage medium, the method may include preventing the user interface from capturing a subsequent image in response to an unsatisfactory inspection result based on the comparison of a previous captured image with the corresponding reference image.

In some implementations of the computer-readable storage medium, the method may include determining a region-specific inspection result based on determining within a degree of certainty that the captured image for a specific region matches the corresponding reference image for the specific region and represents a properly cleaned area.

In some implementations of the computer-readable storage medium, the method may include obtaining parameters characterizing the plurality of cleaning regions. In some implementations of the computer-readable storage medium, the method may include defining the plurality of cleaning regions based on the obtained characterizing parameters.

In some implementations of the computer-readable storage medium, the method may include obtaining boundaries characterizing the plurality of cleaning regions. In some implementations of the computer-readable storage medium, the method may include defining the plurality of cleaning regions based on the obtained boundaries.

In some implementations of the computer-readable storage medium, the method may include defining the boundaries characterizing the plurality of cleaning regions.

In some implementations of the computer-readable storage medium, the method may include, for a new cleaning period, randomly generating an updated set of inspection regions, the updated set of inspection regions being different from the originally generated set of inspection regions.

In some implementations of the computer-readable storage medium, the new cleaning period may include a new cleaning shift.

In some implementations of the computer-readable storage medium, the new cleaning period may include a new calendar date.

In some implementations of the computer-readable storage medium, the method may be a part of a self-verification process such that the user prompted to capture the images is also the person assigned to perform the cleaning services being verified.

Still another aspect of the present disclosure relates to a system configured for verification of cleaning services to be performed in an area to be cleaned. The system may include means for identifying, from among a plurality of cleaning regions relating to the area to be cleaned, a group of designated cleaning regions. The system may include means for randomly generating, with respect to the plurality of cleaning regions, a set of inspection regions. The set of inspection regions may be a subset of the plurality of cleaning regions and including at least one of the designated cleaning regions. The system may include means for providing a user interface to prompt a user to capture an image of each inspection region in the set of inspection regions. The system may include means for directly capturing the images of each inspection region via the user interface. The system may include means for comparing the captured images of each inspection region with corresponding reference images to determine whether each of the inspection regions has been properly cleaned. The system may include means for outputting an inspection result based on the comparison of the captured images with the corresponding reference images.

In some implementations of the system, the system may include means for randomly generating at least one designated cleaning region from among the identified group of designated cleaning regions. In some implementations of the system, the system may include means for randomly generating remaining regions in the set of inspection regions from among the plurality of cleaning regions that are absent from the group of designated cleaning regions.

In some implementations of the system, the system may include means for determining the group of designated cleaning regions based on a stored cleaning profile.

In some implementations of the system, the system may include means for determining whether each of the plurality of cleaning regions belongs in the group of designated cleaning regions based on the stored cleaning profile.

In some implementations of the system, the stored cleaning profile may include a property type-specific cleaning profile.

In some implementations of the system, the stored cleaning profile may include an industry-specific cleaning profile.

In some implementations of the system, the stored cleaning profile may include a franchisor-specific cleaning profile.

In some implementations of the system, the stored cleaning profile may include an owner-specific cleaning profile.

In some implementations of the system, the stored cleaning profile may include a contract-specific cleaning profile.

In some implementations of the system, the stored cleaning profile may include a site-specific cleaning profile.

In some implementations of the system, randomly generating the set of inspection regions may be performed based on a random number generator.

In some implementations of the system, randomly generating the set of inspection regions may be performed based on a quasi-random number generator.

In some implementations of the system, directly capturing the images may include obtaining a live camera capture from a user device.

In some implementations of the system, directly capturing the images may include obtaining a live camera capture from a user device while preventing any other means of image capture.

In some implementations of the system, the system may include means for storing the directly captured images of each inspection region in an image capture memory that is inaccessible to the user and independent of a user device.

In some implementations of the system, the system may include means for storing the captured images at a cloud server such that the captured images are accessible using a uniform resource locator.

In some implementations of the system, the system may include means for, for a selected inspection region from among the set of inspection regions, providing a selected inspection region reference image in a first portion of a split-screen user interface. In some implementations of the system, the system may include means for, for a selected inspection region from among the set of inspection regions, providing an image capture preview in a second portion of the split-screen user interface to prompt the user to capture an image of the selected inspection region.

In some implementations of the system, providing the image capture preview in the second portion of the split-screen user interface may include obtaining a live camera capture from a user device.

In some implementations of the system, the system may include means for providing, via the user interface, a user authentication to determine that the user being prompted to capture the image corresponds to a person assigned to perform the cleaning services being verified.

In some implementations of the system, the system may include means for comparing, using a machine learning-based comparator, the captured images of each inspection region with the corresponding reference images. In some implementations of the system, the system may include means for generating the inspection result based at least in part on a result of the comparison using the machine learning-based comparator.

In some implementations of the system, the system may include means for sending, for external verification, at least one of the captured images and the corresponding reference images. In some implementations of the system, the system may include means for outputting the inspection result based at least in part on a received external verification result.

In some implementations of the system, with respect to a first inspection region and a subsequent second inspection region in the set of inspection regions. In some implementations of the system, the system may include means for providing the user interface to prompt the user to capture a second image of the second inspection region only in response to a satisfactory first inspection result based on the comparison of a first captured image of the first inspection region with the corresponding reference image.

In some implementations of the system, the system may include means for preventing the user interface from capturing a subsequent image in response to an unsatisfactory inspection result based on the comparison of a previous captured image with the corresponding reference image.

In some implementations of the system, the system may include means for determining a region-specific inspection result based on determining within a degree of certainty that the captured image for a specific region matches the corresponding reference image for the specific region and represents a properly cleaned area.

In some implementations of the system, the system may include means for obtaining parameters characterizing the plurality of cleaning regions. In some implementations of the system, the system may include means for defining the plurality of cleaning regions based on the obtained characterizing parameters.

In some implementations of the system, the system may include means for obtaining boundaries characterizing the plurality of cleaning regions. In some implementations of the system, the system may include means for defining the plurality of cleaning regions based on the obtained boundaries.

In some implementations of the system, the system may include means for defining the boundaries characterizing the plurality of cleaning regions.

In some implementations of the system, the system may include means for, for a new cleaning period, randomly generating an updated set of inspection regions, the updated set of inspection regions being different from the originally generated set of inspection regions.

In some implementations of the system, the new cleaning period may include a new cleaning shift.

In some implementations of the system, the new cleaning period may include a new calendar date.

In some implementations of the system, the method may be a part of a self-verification process such that the user prompted to capture the images is also the person assigned to perform the cleaning services being verified.

Even another aspect of the present disclosure relates to a computing platform configured for verification of cleaning services to be performed in an area to be cleaned. The computing platform may include a non-transient computer-readable storage medium having executable instructions embodied thereon. The computing platform may include one or more hardware processors configured to execute the instructions. The processor(s) may execute the instructions to identify, from among a plurality of cleaning regions relating to the area to be cleaned, a group of designated cleaning regions. The processor(s) may execute the instructions to randomly generate, with respect to the plurality of cleaning regions, a set of inspection regions. The set of inspection regions may be a subset of the plurality of cleaning regions and including at least one of the designated cleaning regions. The processor(s) may execute the instructions to provide a user interface to prompt a user to capture an image of each inspection region in the set of inspection regions. The processor(s) may execute the instructions to directly capture the images of each inspection region via the user interface. The processor(s) may execute the instructions to compare the captured images of each inspection region with corresponding reference images to determine whether each of the inspection regions has been properly cleaned. The processor(s) may execute the instructions to output an inspection result based on the comparison of the captured images with the corresponding reference images.

In some implementations of the computing platform, the processor(s) may execute the instructions to randomly generate at least one designated cleaning region from among the identified group of designated cleaning regions. In some implementations of the computing platform, the processor(s) may execute the instructions to randomly generate remaining regions in the set of inspection regions from among the plurality of cleaning regions that are absent from the group of designated cleaning regions.

In some implementations of the computing platform, the processor(s) may execute the instructions to determine the group of designated cleaning regions based on a stored cleaning profile.

In some implementations of the computing platform, the processor(s) may execute the instructions to determine whether each of the plurality of cleaning regions belongs in the group of designated cleaning regions based on the stored cleaning profile.

In some implementations of the computing platform, the stored cleaning profile may include a property type-specific cleaning profile.

In some implementations of the computing platform, the stored cleaning profile may include an industry-specific cleaning profile.

In some implementations of the computing platform, the stored cleaning profile may include a franchisor-specific cleaning profile.

In some implementations of the computing platform, the stored cleaning profile may include an owner-specific cleaning profile.

In some implementations of the computing platform, the stored cleaning profile may include a contract-specific cleaning profile.

In some implementations of the computing platform, the stored cleaning profile may include a site-specific cleaning profile.

In some implementations of the computing platform, randomly generating the set of inspection regions may be performed based on a random number generator.

In some implementations of the computing platform, randomly generating the set of inspection regions may be performed based on a quasi-random number generator.

In some implementations of the computing platform, directly capturing the images may include obtaining a live camera capture from a user device.

In some implementations of the computing platform, directly capturing the images may include obtaining a live camera capture from a user device while preventing any other means of image capture.

In some implementations of the computing platform, the processor(s) may execute the instructions to store the directly captured images of each inspection region in an image capture memory that is inaccessible to the user and independent of a user device.

In some implementations of the computing platform, the processor(s) may execute the instructions to store the captured images at a cloud server such that the captured images are accessible using a uniform resource locator.

In some implementations of the computing platform, the processor(s) may execute the instructions to, for a selected inspection region from among the set of inspection regions, provide a selected inspection region reference image in a first portion of a split-screen user interface. In some implementations of the computing platform, the processor(s) may execute the instructions to, for a selected inspection region from among the set of inspection regions, provide an image capture preview in a second portion of the split-screen user interface to prompt the user to capture an image of the selected inspection region.

In some implementations of the computing platform, providing the image capture preview in the second portion of the split-screen user interface may include obtaining a live camera capture from a user device.

In some implementations of the computing platform, the processor(s) may execute the instructions to provide, via the user interface, a user authentication to determine that the user being prompted to capture the image corresponds to a person assigned to perform the cleaning services being verified.

In some implementations of the computing platform, the processor(s) may execute the instructions to compare, using a machine learning-based comparator, the captured images of each inspection region with the corresponding reference images. In some implementations of the computing platform, the processor(s) may execute the instructions to generate the inspection result based at least in part on a result of the comparison using the machine learning-based comparator.

In some implementations of the computing platform, the processor(s) may execute the instructions to send, for external verification, at least one of the captured images and the corresponding reference images. In some implementations of the computing platform, the processor(s) may execute the instructions to output the inspection result based at least in part on a received external verification result.

In some implementations of the computing platform, with respect to a first inspection region and a subsequent second inspection region in the set of inspection regions. In some implementations of the computing platform, the processor(s) may execute the instructions to provide the user interface to prompt the user to capture a second image of the second inspection region only in response to a satisfactory first inspection result based on the comparison of a first captured image of the first inspection region with the corresponding reference image.

In some implementations of the computing platform, the processor(s) may execute the instructions to prevent the user interface from capturing a subsequent image in response to an unsatisfactory inspection result based on the comparison of a previous captured image with the corresponding reference image.

In some implementations of the computing platform, the processor(s) may execute the instructions to determine a region-specific inspection result based on determining within a degree of certainty that the captured image for a specific region matches the corresponding reference image for the specific region and represents a properly cleaned area.

In some implementations of the computing platform, the processor(s) may execute the instructions to obtain parameters characterizing the plurality of cleaning regions. In some implementations of the computing platform, the processor(s) may execute the instructions to define the plurality of cleaning regions based on the obtained characterizing parameters.

In some implementations of the computing platform, the processor(s) may execute the instructions to obtain boundaries characterizing the plurality of cleaning regions. In some implementations of the computing platform, the processor(s) may execute the instructions to define the plurality of cleaning regions based on the obtained boundaries.

In some implementations of the computing platform, the processor(s) may execute the instructions to define the boundaries characterizing the plurality of cleaning regions.

In some implementations of the computing platform, the processor(s) may execute the instructions to, for a new cleaning period, randomly generate an updated set of inspection regions, the updated set of inspection regions being different from the originally generated set of inspection regions.

In some implementations of the computing platform, the new cleaning period may include a new cleaning shift.

In some implementations of the computing platform, the new cleaning period may include a new calendar date.

In some implementations of the computing platform, the method may be a part of a self-verification process such that the user prompted to capture the images is also the person assigned to perform the cleaning services being verified.

The invention claimed is:

1. A computing platform configured for verification of cleaning services to be performed in an area to be cleaned, the computing platform comprising:
    a non-transient computer-readable storage medium having executable instructions embodied thereon; and
    one or more hardware processors configured to execute the instructions to:
    identify, from among a plurality of cleaning regions relating to the area to be cleaned, a group of designated cleaning regions;
    randomly select a subset of the plurality of cleaning regions as corresponding to a set of inspection regions, the set of inspection regions including at least one of the designated cleaning regions, each inspection region having a reference image associated therewith representing the inspection region in a properly cleaned state;
    provide a user interface prompting a user to capture an image of each inspection region in the set of inspection regions by displaying the reference image for each inspection region;
    directly capture the images of each inspection region via the user interface; and
    output an inspection result based on a comparison of the captured images with the corresponding reference images.

2. The computing platform of claim 1, wherein the one or more hardware processors are further configured by the instructions to:
    randomly generate at least one designated cleaning region from among the identified group of designated cleaning regions; and
    randomly generate remaining regions in the set of inspection regions from among the plurality of cleaning regions that are absent from the group of designated cleaning regions.

3. The computing platform of claim 1, wherein the one or more hardware processors are further configured by the instructions to: determine the group of designated cleaning regions based on a stored cleaning profile.

4. The computing platform of claim 3, wherein the one or more hardware processors are further configured by the instructions to: determine whether each of the plurality of cleaning regions belongs in the group of designated cleaning regions based on the stored cleaning profile.

5. The computing platform of claim 3, wherein the stored cleaning profile is selected from the group consisting of: a property type-specific cleaning profile; an industry-specific cleaning profile; a franchisor-specific cleaning profile; an owner-specific cleaning profile; a contract-specific cleaning profile; and a site-specific cleaning profile.

6. The computing platform of claim 1, wherein randomly selecting the subset of the plurality of cleaning regions is performed based on a random number generator or based on a quasi-random number generator.

7. The computing platform of claim 1, wherein directly capturing the images comprises obtaining a live camera capture from a user device while preventing any other means of image capture.

8. The computing platform of claim 1, wherein the one or more hardware processors are further configured by the instructions to: store the directly captured images of each inspection region in an image capture memory that is inaccessible to the user and independent of a user device.

9. The computing platform of claim 1, wherein the one or more hardware processors are further configured by the instructions to: store the captured images at a cloud server such that the captured images are accessible using a uniform resource locator.

10. The computing platform of claim 1, wherein the one or more hardware processors are further configured by the instructions to:
    for a selected inspection region from among the set of inspection regions, provide the reference image associated with the selected inspection region in a first portion of a split-screen user interface; and
    for the selected inspection region from among the set of inspection regions, provide an image capture preview in a second portion of the split-screen user interface to prompt the user to capture an image of the selected inspection region.

11. The computing platform of claim 1, wherein the one or more hardware processors are further configured by the instructions to: provide, via the user interface, a user authentication to determine that the user being prompted to capture the image corresponds to a person assigned to perform the cleaning services being verified.

12. The computing platform of claim 1, wherein the one or more hardware processors are further configured by the instructions to: compare, using a machine learning-based comparator, the captured images of each inspection region with the corresponding reference images; and generate the inspection result based at least in part on a result of the comparison using the machine learning-based comparator.

13. The computing platform of claim 1, wherein the one or more hardware processors are further configured by the instructions to: send, for external verification, at least one of the captured images and the corresponding reference images; and output the inspection result based at least in part on a received external verification result.

14. The computing platform of claim 1, wherein the one or more hardware processors are further configured by the instructions to: with respect to a first inspection region and a subsequent second inspection region in the set of inspection regions, provide the user interface to prompt the user to capture a second image of the second inspection region only in response to a satisfactory first inspection result based on the comparison of a first captured image of the first inspection region with the corresponding reference image.

15. The computing platform of claim 1, wherein the one or more hardware processors are further configured by the instructions to: prevent the user interface from capturing a subsequent image in response to an unsatisfactory inspection result based on the comparison of a previous captured image with the corresponding reference image.

16. The computing platform of claim 1, wherein the one or more hardware processors are further configured by the instructions to: determine a region-specific inspection result based on determining within a degree of certainty that the captured image for a specific region matches the corresponding reference image for the specific region and represents a properly cleaned area.

17. The computing platform of claim 1, wherein the one or more hardware processors are further configured by the instructions to: for a new cleaning period, randomly select a new subset of the plurality of cleaning regions as corresponding to an updated set of inspection regions, the updated set of inspection regions being different from the originally select set of inspection regions.

18. The computing platform of claim 1, wherein the instructions are carried out as a part of a self-verification process such that the user prompted to capture the images is also the person assigned to perform the cleaning services being verified.

19. A computer-implemented method for verification of cleaning services to be performed in an area to be cleaned, the method comprising:

identifying, from among a plurality of cleaning regions relating to the area to be cleaned, a group of designated cleaning regions;

randomly selecting a subset of the plurality of cleaning regions as corresponding to a set of inspection regions, the set of inspection regions including at least one of the designated cleaning regions, each inspection region having a reference image associated therewith representing the inspection region in a properly cleaned state;

providing a user interface prompting a user to capture an image of each inspection region in the set of inspection regions by displaying the reference image for each inspection region;

directly capturing the images of each inspection region via the user interface; and outputting an inspection result based on a comparison of the captured images with the corresponding reference images.

20. A non-transient computer-readable storage medium having instructions embodied thereon, the instructions being executable by one or more processors to perform a method for verification of cleaning services to be performed in an area to be cleaned, the method comprising:

identifying, from among a plurality of cleaning regions relating to the area to be cleaned, a group of designated cleaning regions;

randomly selecting a subset of the plurality of cleaning regions as corresponding to a set of inspection regions, the set of inspection regions including at least one of the designated cleaning regions, each inspection region having a reference image associated therewith representing the inspection region in a properly cleaned state;

providing a user interface prompting a user to capture an image of each inspection region in the set of inspection regions by displaying the reference image for each inspection region;

directly capturing the images of each inspection region via the user interface; and outputting an inspection result based on a comparison of the captured images with the corresponding reference images.

* * * * *